United States Patent [19]
Lehrer

[11] 3,781,940
[45] Jan. 1, 1974

[54] HAND-OPERATED SWEEPERS

[76] Inventor: Solomon J. Lehrer, 77 W. Washington St., Chicago, Ill. 60602

[22] Filed: Mar. 15, 1972

[21] Appl. No.: 234,818

[52] U.S. Cl. ............................ 15/104.8, 15/257.3
[51] Int. Cl. ....................... A46b 13/08, A47l 13/52
[58] Field of Search ................. 15/47, 49 RB, 79, 15/81, 104.8, 257.2, 257.3; 56/203, 328 R; 294/19 A, 55

[56] References Cited
UNITED STATES PATENTS

| | | | |
|---|---|---|---|
| 2,224,694 | 12/1940 | Price | 15/104.8 |
| 1,244,083 | 10/1917 | Schroeder | 15/81 |
| 1,223,105 | 9/1917 | Pigott | 15/257.3 |
| 2,999,259 | 9/1961 | Polner | 15/104.8 |

FOREIGN PATENTS OR APPLICATIONS

| | | | |
|---|---|---|---|
| 633,849 | 2/1962 | Italy | 15/104.8 |

*Primary Examiner*—Daniel Blum
*Attorney*—William F. Frank

[57] ABSTRACT

A sweeper for litter dropped on floors and carpets which has a broom in a bottom housing. A push rod rises from the latter to terminate with a handle. A trigger in the handle operates by way of slides in the housing to advance the broom from a raised position in the housing to a sweeping position spaced forwardly from the same; and the broom takes a rearward sweeping movement when the trigger is released. A spring mechanism in the housing is automatically actuated to hold the broom in the raised position on the advance of the slides and in the sweeping position on the return thereof.

9 Claims, 4 Drawing Figures

PATENTED JAN 1 1974
3,781,940
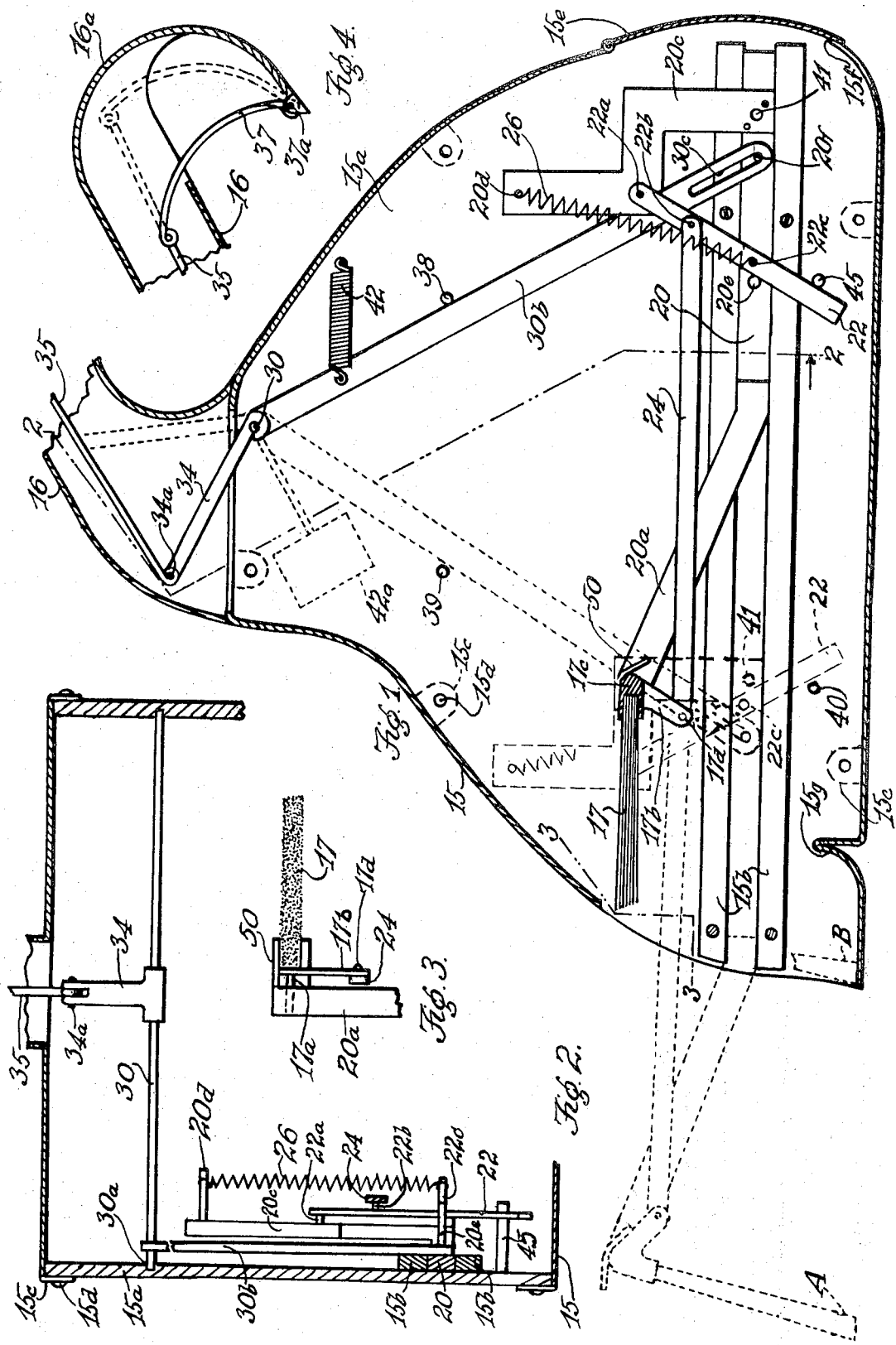

HAND-OPERATED SWEEPERS

This invention relates to hand-operated sweepers for collecting litter dropped on floors and carpets, and more particularly to sweepers in which a broom is cast forwardly over the area occupied by the litter and retracted to sweep the litter into a receptacle.

One object of the invention is to conceal the broom within the front of a bottom housing, in order that an unobstructed view and approach may be had to litter in the advancing path of the sweeper.

A further object is to employ a manually-actuated mechanism for casting the broom over and beyond litter in front of the sweeper, and automatic means to retract the broom with a sweeping movement.

Another object is to provide a broom holder which advances and returns in a substantially horizontal plane, such broom holder supporting the broom raised to clear litter on the advance and depressed to sweep the litter on the return.

In the accompanying drawing

FIG. 1 is a full-sized side view of the lower part of the sweeper, with its housing in section;

FIG. 2 is a section on the line 2—2 of FIG. 1, with a duplicate portion at the right omitted;

FIG. 3 is a section of one end of the broom area, taken on the line 3—3 of FIG. 1; and FIG. 4 is a section of a manual control.

Specific reference to the drawing indicates the housing of the sweeper at 15; and a tubular push rod 16 rises in rearward direction from the housing to terminate with a hook-shaped handle 16a suitable to hang the sweeper from a nail or wall-hook when it is not in use.

Full lines in FIG. 1 indicate that a broom 17, which is a thin brush, extends crosswise of the housing in a raised position. The broom is pivoted at 17a within the front of the housing to the arms 20a of a pair of slides 20, these being located inwardly of the side walls 15a of the housing. The slides are freely operable between guides 15b secured to the housing walls 15a by suitable means, such as screws 20b. Also, the housing body is preferably made of sheet aluminum, with inturned tabs 15c applied to the side walls 15a and secured to the same by screws 15d.

The sweeper is applicable to small litter like cigarette remnants, chewing gum wrappers, cigar ends and loose material like crumbs or ashes, such litter seldom being higher than an inch. Thus, the raised position of the broom enables it to travel well above the type of litter mentioned on the advance. The broom is concealed in the housing as viewed from above; and the housing recedes in front to afford an unobstructed view of litter in the advancing path of the sweeper. A mechanism to keep the broom raised is carried by the slides 20. The righthand end of FIG. 1 shows that an extension 20c rises from the slide shown. A pendent lever 22 is pivoted at its upper end to the extension as indicated at 22a. The lever has a forward slant; and a heel 17b is extended likewise from the head 17c of the broom 17. A long bar 24 is pivotally connected with its front end to the lever end of the heel 17b as indicated at 17d; and at the same height the bar 24 connects pivotally with its rear end to the lever 22 as indicated at 22b. The heel and lever thus form parallel links; and they are held in the full-line position shown by a spring 26 directed from a side pin 20d at the top of the extension 20c to a side pin 22c at the lower part of the lever 22. The latter is held by the spring 26 against a stop pin 20e projecting from the slide 20.

Means are provided for advancing the slides 20 in order to carry the broom over litter in front of the sweeper. A hanger is employed for this purpose originating with a cross-rod 30 in the upper part of the housing and more clearly shown in FIG. 2. The cross-rod is journaled in the walls of the housing as indicated at 30a and carries a rigidly attached pair of pendent and rearwardly inclined side bars 30b which terminate along the inner sides of the related slides 20. Here each side bar is longitudinally slotted at 30c to receive a pin 20f from the related slide through the bottom of the slot. The cross-rod 30 carries a rigidly attached crank 34 in the center, which rises to make a pivoting connection 34a with a long link 35. The latter rises through the tubular push rod; and FIG. 4 shows that the upper end of the link 35 connects with a trigger 37 pivoted in the handle at 37a. When the trigger is retracted the link 35 is drawn to swing the hanger side bars 30b in forward direction from rear stop pins 38 projecting from the housing side walls to forward stop pins 39 similarly mounted. The side bars therefore push the slides in substantially horizontal paths to the advanced positions indicated by dotted lines in FIG. 1.

The advance of the broom, positioned and carried as described, is designed to terminate at a point a few inches forwardly of the housing. Now each lever 22 meets a side pin 40 projecting from the related side wall of the housing, and is caused to rotate to the position indicated by dotted lines in the lower center of FIG. 1. This action is transmitted by the long bars 24 to the heels 17b of the broom 17 with the effect of rotating it in downward direction to the position indicated by dotted lines A at the left end of FIG. 1. It is now noted that the levers 22 have strained the springs 26 rearwardly past center, so that they draw on the levers to hold them against stop pins 41 extended from the rear portions of the slides 20, as also indicated by dotted lines.

The advance of the hanger bars 30b draws on springs 42 extended from the side walls of the housing, or raises equivalent weight means 42a indicated by dotted lines. The dotted line position A of the broom 17 is at the inception of its rearward sweeping stroke which proceeds, when the trigger 37 is released, to a point indicated by dotted lines B just inside the front of the housing.

The rearward sweeping movement of the broom is extended to cause the levers 22 to meet side pins 45 projected from the housing walls and be swung from the dotted line position in the lower center of FIG. 1 to the full line (original) position indicated. This action procures the upswing of the broom to the full line raised position, so that it may advance above litter when the trigger is again retracted; and the maintenance of the broom in such position is insured by the alternate action of the springs 26, as previously explained. To reinforce the pivoting limits of the broom, FIGS. 1 and 3 show a curved flange 50 carried by each arm 20a over the ends of the broom head 17c. This flange provides fixed end limits for the swing of the broom, and also serves as a guard.

Since bits or deposits of the type of litter mentioned generally occur singly and occupy little space, they would be engaged mostly by the middle portion of the broom. Therefore, the sweeper need be only as wide as will keep it stable; and no mechanism projects from the housing while the sweeper is not in use or before a sweeping operation.

It is now apparent that the movement of the broom holder in a substantially level course determines the proper overhead position of the broom when advancing and its sweeping contact on the return. Further, the free or even loose travel of the slides will not affect the action of the broom, but allow it to drag by its own weight for sweeping loose material more effectively. Further, the slides are kept in the guides because they are spaced in front by the broom, and at the rear by the hanger bars 30b. Further, the downward swing of the broom at the front end of its travel causes it to engage the litter gradually; and the litter should gather sufficient momentum to hurdle a concave guard 15g in the housing entrance for deposit in the spacious bottom of the housing. The latter has a hinged lid 15e at the rear which normally closes an opening 15f in the back wall of the housing, but drops open to discard collected litter when the push rod 16 is raised to tilt the housing in clockwise direction from the position shown. Further, the requirement for using the sweeper is only to fully retract the trigger 37 and release it, while the sweeping movement and terminal rotations of the broom are procured automatically. Finally, the sweeper may be made very light and with a polished bottom surface to glide over floors and carpets without the need of wheels or rollers.

I claim:

1. A sweeper comprising a housing having an open lower front portion and handle means extending upwardly from the housing, a slidable broom holder assembly within said housing, a rotatable broom assembly mounted on the forward end of said holder assembly with the broom in a horizontal position, first lever means interconnecting said holder assembly and said broom assembly for rotation of the latter, second lever means pivotally mounted within said housing under bias and operably connected to said holder assembly for horizontal movement thereof, third lever means within said handle and operable with said second lever means to rotate same against said bias to move said holder assembly at least partially forward of said housing with said broom in said horizontal position, first stop means within said housing engaging said first lever means at the end of said holder assembly forward movement to rotate said broom downwardly into sweeping contact with a surface, and second stop means engaging said first lever means to rotate said broom to said horizontal position when said holder assembly is moved back within said housing by said bias upon release of said third lever means.

2. The sweeper according to claim 1, further comprising spaced stop means on said holder assembly engaging and holding said first lever means in contact with said first and second stop means.

3. The sweeper according to claim 2, further comprising resilient tension means interconnecting said holder assembly and said first lever means to maintain said first lever means in contact with one of said spaced stop means at the terminus of the forward and backward movements of said holder assembly.

4. A sweeper comprising a housing with an open front, a hollow push rod rising from the housing to terminate with a handle, a pair of guide bars along each interior side of the housing, a slide bar operable within each pair of guide bars between front and rear limits and formed with an upwardly extending arm on the rear portion and an upwardly sloping extension on the front portion of said slide bar, a broom pivotally mounted on the forward end of said extension and projecting therefrom in a horizontal position within said housing, a first lever attached to each end of said broom, a lever linkage suspended pivotally from each slide extending arm and connected to said respective first lever, a slide bar moving assembly within said housing comprising a spaced pair of hanger bars fixed at one end to a cross-rod journaled within the upper portion of said housing and slidably connected at the other end to the rear portion of said slide bars and means attached to said slide bar moving assembly to bias said hanger bars toward the rear side of said housing, a crank arm fixed on one end to said cross-rod and pivotally attached at the other end to a manually controlled lever assembly within said push rod to rotate said hanger bars forward against said bias means when said lever assembly is retracted at said handle, a first stop on each interior side wall of said housing to engage and move said linkage counterclockwise upon the forward movement of said respective slide bar to rotate the broom to an inclined vertical position when the slide bar reaches the front limit of its movement, and a second stop on each interior side wall to engage and rotate said linkage clockwise upon the rearward movement of said slide bar under said bias means when said manually controlled lever assembly is released to rotate said broom to said horizontal position when the slide bar reaches the rear limit of movement.

5. The sweeper structure of claim 4, further comprising a spring directed from the lever linkage to a point on the upwardly extending arm above the lever linkage pivot, the spring swung by the lever linkage in opposite directions and maintaining the lever linkage in the swung or original position.

6. The structure of claim 5 and abutments carried by the slide bar to limit the swing of the lever linkage to the swung or original position for operative interception by said stops.

7. The structure of claim 1, the housing having a receding front, said broom disposed during sweeping movement in an inclined plane directed similarly to said front, and the bottom surface of the broom shaped to lie in a plane parallel to the sweeping path of the broom.

8. The structure of claim 1, the housing including an upwardly-extending rear wall, and a closure pivotally suspended intermediately of said wall to open outwardly when the housing is tilted in rearward direction.

9. The sweeper structure of claim 4 wherein said lever linkage comprises a pendant lever pivotally attached to said upwardly extending arm and an elongated lever pivotally attached at one end to said pendant lever and pivotally attached at the other end to said first lever, said elongated lever being substantially horizontal and parallel to said slide bar.

* * * * *